(12) United States Patent
Muthuswamy et al.

(10) Patent No.: US 6,853,368 B2
(45) Date of Patent: Feb. 8, 2005

(54) ELECTRONIC DEVICE WITH IMPROVED USER INTERFACE

(75) Inventors: Sivakumar Muthuswamy, Plantation, FL (US); Steven Duane Pratt, Ft. Lauderdale, FL (US); Ronald James Kelley, Coral Springs, FL (US); Robert John Mulligan, Coral Springs, FL (US); Anupama Ramamurthy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 189 days.

(21) Appl. No.: 10/189,902

(22) Filed: Jul. 3, 2002

(65) Prior Publication Data

US 2004/0004598 A1 Jan. 8, 2004

(51) Int. Cl.[7] .................................................. G09G 5/00
(52) U.S. Cl. .......................... 345/168; 345/170; 341/22
(58) Field of Search ................................. 345/168, 170; 341/22

(56) References Cited

U.S. PATENT DOCUMENTS 6,310,609 B1 * 10/2001 Morgenthaler .............. 345/170
6,381,468 B1 * 4/2002 Larsen et al. ............. 455/550.1

* cited by examiner

*Primary Examiner*—Alexander Eisen
(74) *Attorney, Agent, or Firm*—Randi L. Karpinia

(57) ABSTRACT

An electronic device (100) is provided with a plurality of activatable indicia (112, 114, 116, 118, 120, 122, 1102) that are located proximate keys buttons (108, 109, 110) that are used to control the communication device (100). The activatable indicia (112, 114, 116, 118, 120, 122, 1102) are activated in order to identify to a user one or more of the buttons (108, 109 110) to be pressed in order to in the course of entering a command, or to indicate to the user to reorient an antenna of the electronic device in order to improve signal strength.

26 Claims, 6 Drawing Sheets

ELECTRONIC DEVICE WITH IMPROVED USER INTERFACE

BACKGROUND OF THE INVENTION

1. Field of the Invention

The present invention relates in general to electronic devices. More particularly, the present invention relates to improved user interfaces for electronic devices.

2. Description of Related Art

Progress in the electrical arts, has enabled increases in the functionality of consumer oriented electronic devices such as wireless telephones, personal digital assistants (PDAs), audio, and video equipment.

In the past, prior to the advent of digital electronics, analog devices were typically controlled using a plurality of multi position switches and potentiometer knobs. Such controls have the advantage that the state of the device can be ascertained by inspecting the positions of the controls. Users intuitively associate the state of each control (e.g., knob or switch position) with the underlying setting because they have learned the association by repetitively operating each control for a specific purpose.

Currently, the user interfaces of electronic devices are typically digital and include a plurality of momentary contact buttons that are used to navigate a hierarchical menu based user interface that is programmed into the device. In contrast to analog devices, the state of such digital devices cannot be ascertained by inspecting the state of the buttons because after actuation, such momentary contact buttons always return to the same state. Furthermore, users do not necessarily associate a given button with a given function, because the same button may be used for multiple purposes depending on the point within the hierarchical menu at which the button is pressed. Although, at any point in the process of navigating the hierarchical menu system, the state of the device is stored in memory and may be, to some extent, reflected on a display that is included in the user interface, it may not be apparent, particularly to a novice user, what keys must be pressed to complete a desired command. Entering a command to change the state of a digital device typically involves navigating through the hierarchical menu by pressing a sequence of keys. It is often difficult for a novice user to remember sequences of keystrokes required to enter commands.

As more and more functionality is added to electronic devices such as for example in the case of adding PDA functionality to a cellular telephone, it becomes increasingly difficult for users to master the user interfaces.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Figure 1:
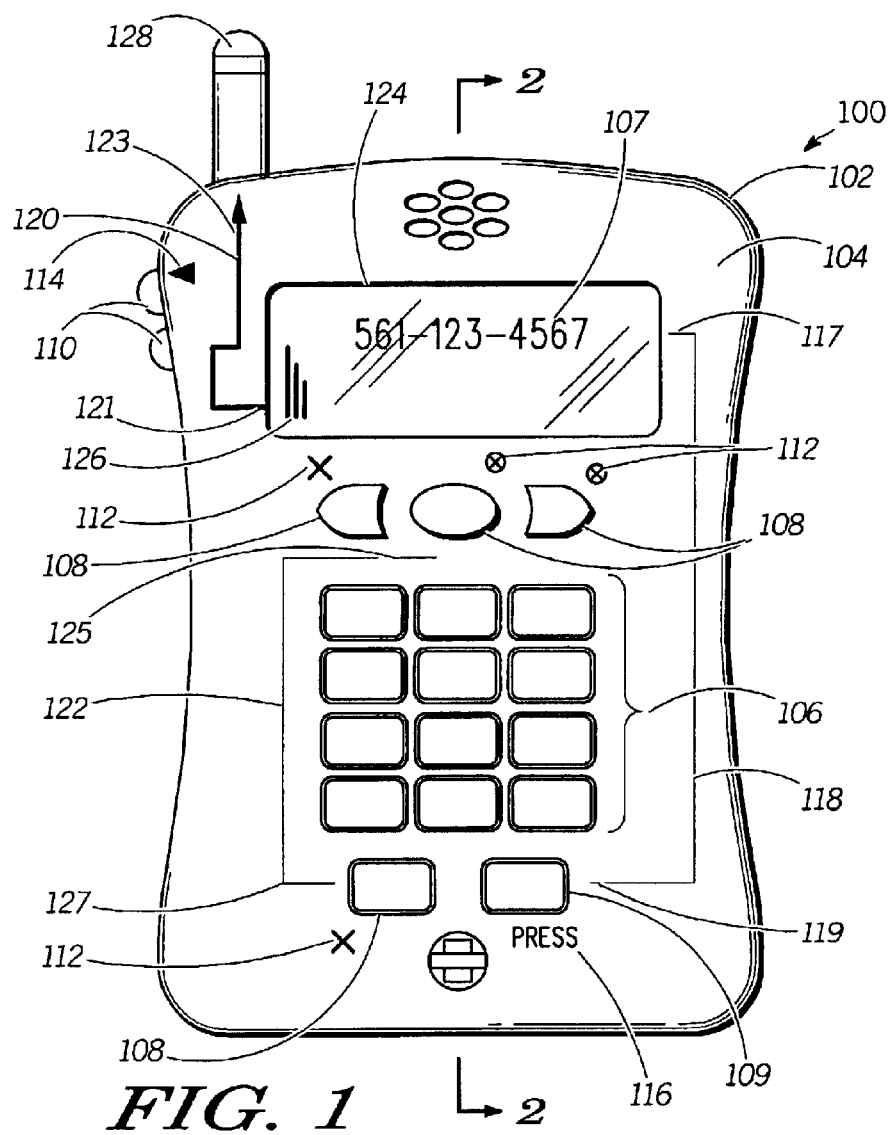
FIG. 1 is a front view of a wireless telephone in accordance with a preferred embodiment of the invention.
Figure 2:
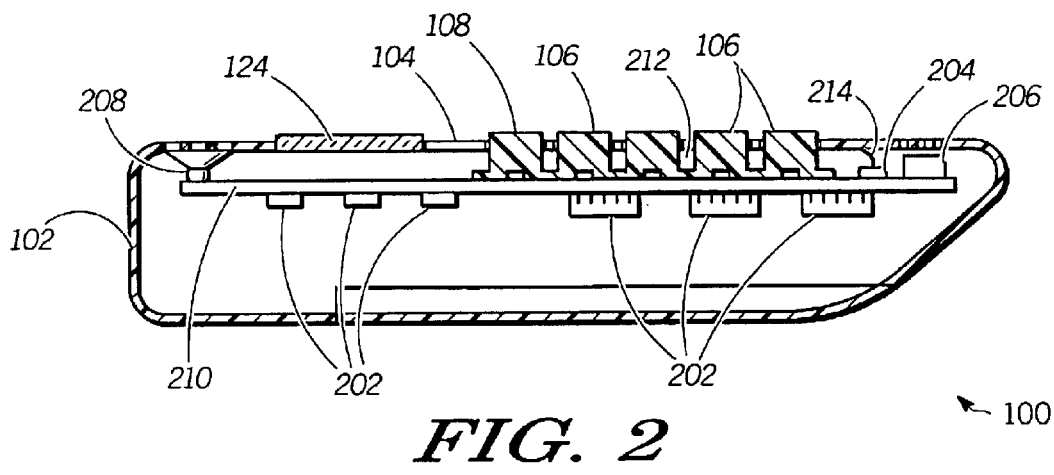
FIG. 2 is a sectional side view of the wireless telephone shown in FIG. 1.

FIG. 1 is a front view of a wireless telephone 100 in accordance with a preferred embodiment of the present invention and FIG. 2 is a sectional side view of the wireless telephone 100 shown in FIG. 1. Although the invention is described herein below with reference to the wireless telephone 100, the invention is alternatively applied to other electronic devices such as for example two-way messaging devices, personal digital assistants, electronic translators, electronic dictionaries, video cassette recorders, and electronic games. The wireless telephone 100 comprises a housing 102 that includes a front housing portion 104. The front housing portion 104 supports a plurality of momentary contact buttons 106, 108, 109, 110, including a set of alphanumeric keys 106 that are used to input alphanumeric data including telephone numbers, and other telephone book data (e.g., names). One or more of the set of alphanumeric keys 106 can also have an associated secondary function that is invoked by pressing a special function key prior to pressing an alphanumeric key 106. It will be appreciated by those of ordinary skill in the art that alternatively the alphanumeric keys 106 can be numeric keys in accordance with the present invention. Also included among the momentary contact buttons 106, 108, 109, 110 are a number of function keys 108, 109. The function keys 108, 109 are used to navigate a hierarchical menu that is programmed into the wireless telephone 100, for purposes including directly accessing configuration settings, for using built in features of the wireless telephone 100 such as a digital memory based telephone book, and/or for placing and receiving telephone calls. Side mounted keys 110 are used to adjust the volume of sound emitted by the wireless telephone 100, and are also used to navigate the hierarchical menu. The function of some of the momentary contact buttons 106, 108, 109, 110 is dependent on the state of the wireless telephone 100. For example if a user has begun navigating the hierarchical menu the side mounted keys 110 are preferably used to choose a menu option, whereas if the user is conducting a telephone call, the side mounted keys 110 are preferably used to control the volume of the telephone 100. Thus, the precise use of each key varies as a function of the state of the wireless telephone 100, and the purpose of each key in each state of the wireless telephone 100 might be unknown to a novice user.

The front housing portion 104 supports a number of activatable indicia 112, 114, 116, 118, 120, 122 that are useful in assisting the user in operating the wireless telephone 100. The activatable indicia 112, 114, 116, 118, 120, 122 include a first plurality of graphical icons 112, that are located proximate a plurality of the function keys 108, a side button graphical icon 114 that is located proximate the side mounted keys 110, selectively activatable text 116, a first linear indicia 118, a second linear indicia 120, and a third linear indicia 122. The first set of graphical icons 112 are selectively activated to indicate to the user, one or a plurality of alternative buttons to be pressed to continue entering or to complete a command that a user has begun entering by pressing a subset of a sequence of keys necessary to execute the command. The side button graphical icon 114 is used to indicate to a user to activate one of the side mounted buttons 110 in order to increase the volume of sound emitted by the wireless telephone 100. The activatable text 116 is used to indicate to a user to press a send key 109 in order to complete or continue a command that the user has initiated. Activatable text is alternatively provided next to other function keys 108. The activatable text 116 is preferably activated by backlighting the activatable text 116. Alternatively, the activatable text 116 is activated by changing the color of the activatable text 116, or by changing the color of a portion of the front housing portion 104 on which the activatable text 116 is located. Color changes are preferably accomplished using thermochromic or electrochromic materials for the text or surrounding portion of the front housing portion 104. It will be appreciated by those of ordinary skill in the art that the activating of the activatable text 116 can be using any combination of methods described above or an alternative. As used in the present description the term linear includes curvilinear, and multi-segment rectilinear shapes, as well as simple line segment shapes.

The wireless telephone 100 preferably further comprises a display 124. The display 124 is used for displaying various information including a graphical indication of signal strength 126, telephones numbers that are dialed from the wireless telephone 100, or telephone numbers from which calls are received on the wireless telephone 100, names corresponding to entries in the digital memory based telephone book, and optionally information indicative of the state of the wireless telephone 100, e.g., battery charge, alert mode setting, and/or current position in the hierarchical menu. The display 124 can be, for example, a liquid crystal display. It will be appreciated by one of ordinary skill in the art that other similar displays can be utilized for the display 124.

The first linear indicia 118 includes a first end 117 that is located proximate an area 107 of the display 124 at which a telephone number is displayed as the telephone number is entered on the alphanumeric keys 106, and a second end 119 that is located proximate a send key 109. The first linear indicia 118 is preferably activated after the user has entered a complete telephone number using the alphanumeric keys 106, in order to prompt the user to press the send key 109 in order to complete a telephone call to the telephone number. The activatable text 116 is preferably simultaneously activated.

The wireless telephone 100 further preferably comprises an antenna 128 that is mechanically supported by the housing 102. The second linear indicia 120 includes a first end 121 that is located proximate the graphical indication of signal strength 126 on the display 124, and a second end 123 that points to the antenna 128. The second linear indicia 120 is preferably activated when a received signal strength drops below a lower limit, in order to indicate to the user to reorient the antenna 128 in order to try to boost the received signal strength.

The third linear indicia 122 includes a first end 125 disposed proximate a first function key 108, and a second end 127 disposed proximate a second function key 108. The third linear indicia 122 is activated to indicate to a user that the second function key 108 can be pressed after the first function key 108 has been pressed in order to continue a keystroke sequence necessary to enter a command. The first and second function keys 108 that are disposed proximate the first end 125 and the second end 127 of the third linear indicia 122 are preferably consecutive keys in the sequence of keys necessary to enter the aforementioned command. A plurality of linear indicia that lead from a last pressed function keys 108 to a plurality of alternative next function keys 108 are alternatively provided.

As shown in FIG. 2, the housing 102 of the wireless telephone 100 encloses a circuit substrate 210. The circuit substrate 210 supports a keypad 212 that includes the alphanumeric keys 106 and the function keys 108. The circuit substrate 210 also supports a number of other electrical circuit components 202, 204, 206, 208, including a microphone 206, a speaker 208, and an activatable indicia driver 204. The nature of the activatable indicia driver 204 (e.g., optical or electrical) depends on the nature of the activatable indicia to which the driver 204 is coupled. The activatable indicia driver 204 is coupled to the first linear indicia 118 through a coupling 214. Although only one activatable indicia driver 204 is visible in the side view of FIG. 2, there are preferably a plurality of activatable indicia drivers 204 for driving all the activatable indicia 112, 114, 116, 118, 120, 122.

Figure 3:
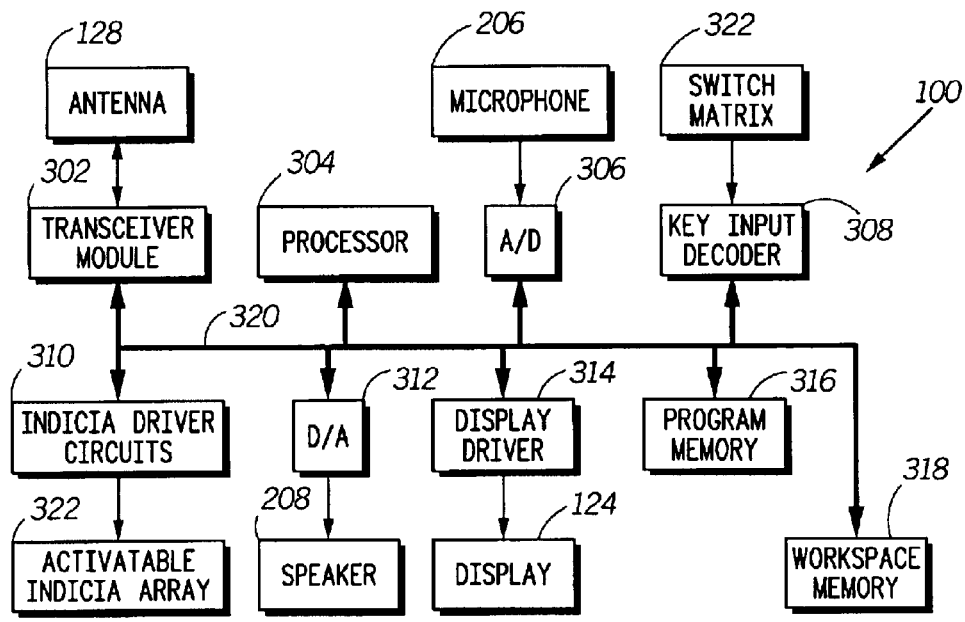
FIG. 3 is a block diagram of the wireless telephone shown in FIG. 1 in accordance with a preferred embodiment of the invention.

FIG. 3 is a block diagram of the wireless telephone 100 shown in FIG. 1 in accordance with a preferred embodiment of the invention. As shown in FIG. 3, the wireless telephone 100 comprises a transceiver module 302, a processor 304 (e.g., a digital signal processor), an analog to digital converter (A/D) 306, a key input decoder 308, a plurality of indicia drivers 310, a digital to analog converter (D/A) 312, a display driver 314, and a program memory 316, and a workspace memory 318 coupled together through a digital signal bus 320.

The transceiver module 302 is coupled to the antenna 128. The A/D 306 is coupled to the microphone 206. Carrier signals that are modulated with data, e.g., audio data, pass between the antenna 128, and the transceiver 302.

The microphone 206 is coupled to the A/D 306. Audio, including spoken words and ambient noise, is input through the microphone 206 and converted to digital format by the A/D 306.

A switch matrix 322 that includes the alphanumeric keys 106, the function keys 108 and the side mounted keys 110, and associated circuitry is coupled to the key input decoder 308. The key input decoder 308 serves to identify depressed keys, and provide information identifying each depressed key to the processor 304.

The indicia driver circuit 310, which comprises one or more activatable indicia drivers 204, is coupled to an activatable indicia array 322. The activatable indicia array 322 comprises the first set of graphical icons 112, the side button graphical icon 114, the selectively activatable text 116, and the linear indicia 118–122. The indicia driver circuits 310 drive activatable indicia 112, 114, 116, 118–122 in response to signals received from the microprocessor 304.

The D/A 312 is coupled to the speaker 208. The D/A 312 converts decoded digital audio to analog signals and drives the speaker 208. The display driver 314 is coupled to the display 124.

The program memory 316 is used to store programs that control the wireless telephone 100. The programs stored in the program memory 316 are executed by the processor 304. The workspace memory 318 is used as a workspace by the processor 304 in executing programs. Methods that are carried out by programs stored in the program memory 316 are described below with reference to FIGS. 4–7. The program memory 316 is a form of computer readable media. Other forms of computer readable media can alternatively be used to store programs that are executed by the processor 304.

The transceiver module 302, processor 304, A/D 306, key input decoder 308, indicia driver circuits 310, D/A 312, display driver 314, program memory 316, workspace memory 318, and switch matrix 322 are preferably embodied in the electrical circuit components 202, the activatable indicia driver 204, and electrical interconnections of the printed circuit substrate 210 shown in FIG. 2.

Figure 4:
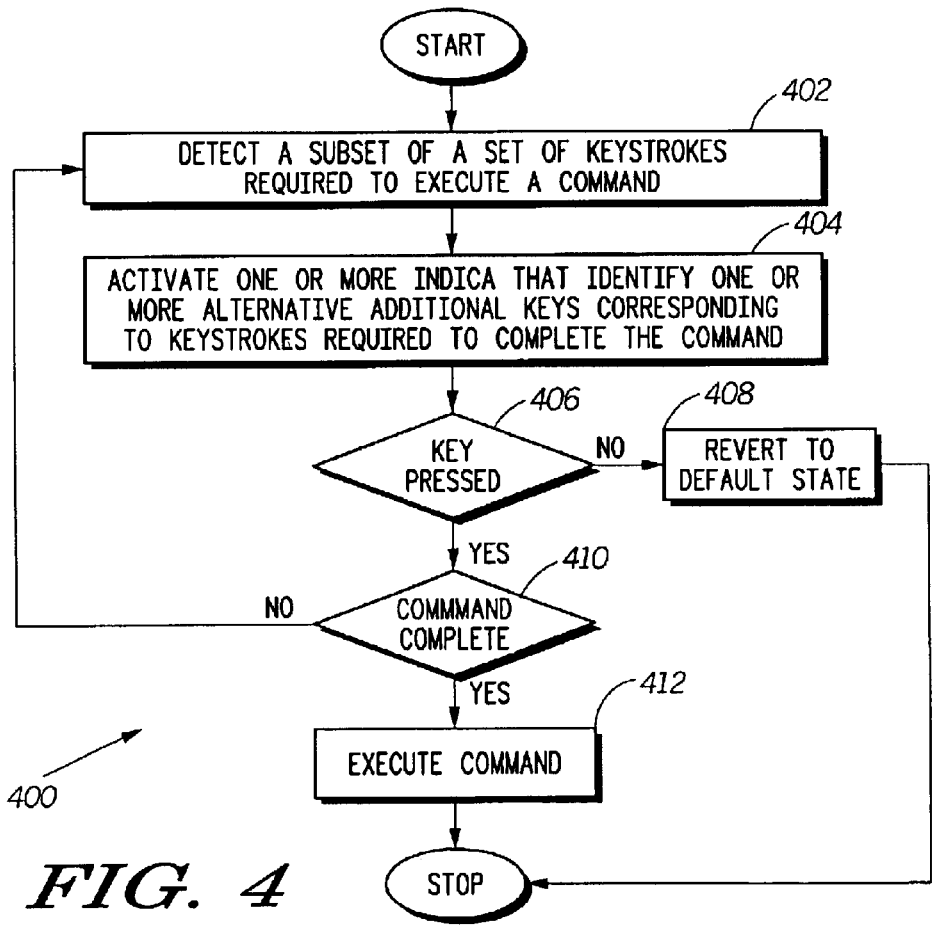
FIG. 4 is a flow chart of a first method for operating the wireless telephone shown in FIGS. 1–3 in accordance with a preferred embodiment of the invention.

FIG. 4 is a flow chart of a first method 400 for operating the wireless telephone 100 shown in FIGS. 1–3 in accordance with a preferred embodiment of the invention. Referring to FIG. 4, in step 402 a subset of a set of keystrokes required to execute a command is detected. The subset of the set of keystrokes detected in step 402 comprises one or more keystrokes.

The command that is embodied in the set of keystrokes is alternatively any of a variety of types of commands. Examples of commands are: a command to set a password for use of the wireless telephone 100, a command to store a new telephone number; a command to enable an alternative ring style, and a command to dial a telephone number. At least some of the commands used to control the wireless telephone 100 are preferably arranged in a hierarchical menu in which topically related commands (e.g., all commands related to security settings) are grouped together under a common parent node of the hierarchical menu (e.g., in a sub-menu entitled 'security settings'). In order to enter a command the user uses the function keys 108 and the side mounted keys 110 to navigate to a particular submenu of the hierarchical menu and select lower level submenus or options. In the course of entering certain types of commands, it is sometimes also necessary to use the alphanumeric keys 106 to enter data such as for example a telephone number to be stored. Navigating such a hierarchical menu to enter a command entails pressing a sequence of keys. At any given point within the sequence prior to completion of the sequence, at least one, and more usually one of a limited set of keys can be pressed in order to continue entering a syntactically correct command. At each juncture within the sequence, pressing a particular key that is part of the limited set of possible (syntactically correct) next keys, specifies more precisely a command that is being entered. This method 400 assists a user who does not necessarily know which keys among all the keys of the wireless device 100 are valid keys to press at different junctures in the process of entering a sequences of keys required to enter syntactically correct commands.

In step 404 one or more activatable indicia that identify one or more alternate additional keys corresponding to keystrokes required to continue entering or complete a command are activated. At a point at which only a subset of a set of keys required to enter a command have been entered there are usually two or more different keys that can be pressed to continue entering or complete a command. Usually at least two of the two or more different key when pressed will result in a different command being executed or with wireless telephone 100 going into a different state (e.g., a state manifested by a different menu being presented on the display 124). Typically, only a limited subset of the keys of the wireless telephone 100 are appropriate to press. The indicia activated in step 404 identify one or more keys corresponding to valid keystrokes.

Alternatively, a timing step is included between steps 402, 404, and the execution of step 404 is made contingent upon a predetermined time interval, (for example 4 seconds), elapsing since a last key in the subset of the set of keystrokes was detected in step 402. In effect, if the user demonstrates facility in operating the wireless telephone 100 by rapidly pressing a sequence of keys without hesitation the activation of the indicia in step 404 is skipped.

Block 406 is a decision block the outcome of which depends on whether a keystroke is detected. If a keystroke is not detected then in step 408 the wireless telephone 100 reverts to a default state, (e.g., the state at power up). Alternatively, the wireless device awaits further input. If a further keystroke is detected then in block 410 it is determined if the command is complete. If the command is not complete then the method loops back to step 402 in which further keystrokes are detected. If in block 410 it is determined that the command is complete then in step 412 the command is executed. The method shown in FIG. 4 is alternatively implemented as a part of a tutorial program that is run when a user operates the wireless telephone 100 for the first time.

Figure 5:
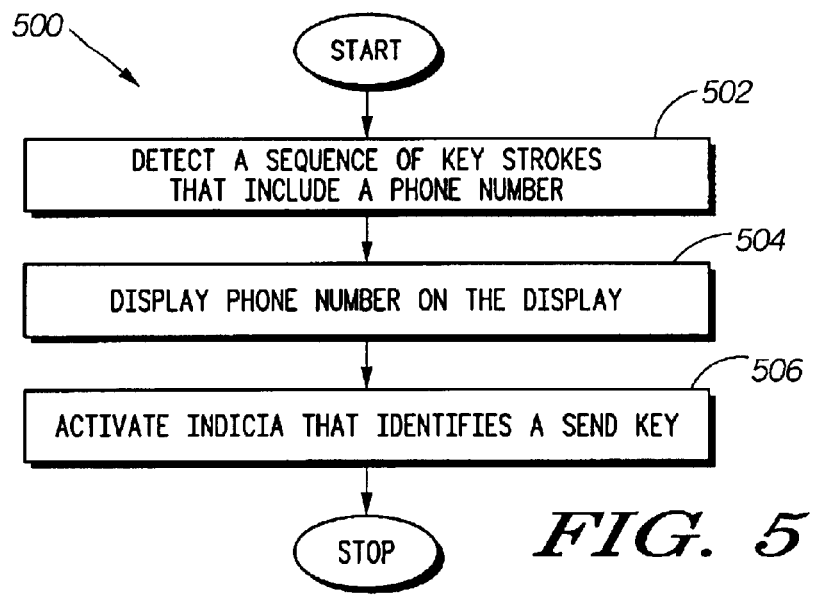
FIG. 5 is a flow chart of a more specific method for operating the wireless telephone shown in FIGS. 1–3 in accordance with a preferred embodiment of the invention.

FIG. 5 is a flow chart of a more specific method 500 for operating the wireless telephone 100 shown in FIGS. 1–3 according to the preferred embodiment of the invention. In step 502 a sequence of keystrokes that include a telephone number is detected. In step 504, in response to the preceding step 502, the telephone number is displayed on the display 124. In block 506, in response to the first step 502 one or more indicia that identify a send key 109. The indicia that are activated in step 506 preferably include the first linear indicia 118, and the activatable text 116. Activating the first linear indicia 118 and the activatable text 116 cues the user to press the send key 109.

Figure 6:
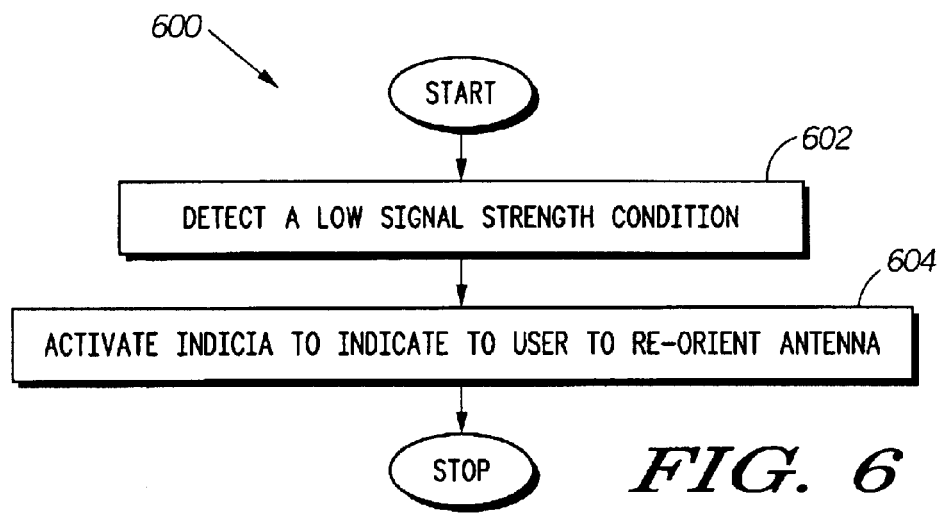
FIG. 6 is a flow chart of a second method for operating the wireless telephone shown in FIGS. 1–3 in accordance with a preferred embodiment of the invention.

FIG. 6 is a flow chart of a second method 600 for operating the wireless telephone 100 shown in FIGS. 1–3 in accordance with a preferred embodiment of the invention. Referring to FIG. 6 in step 602 a low signal strength is detected. A signal strength indication is preferably generated by the transceiver module 302, and read by the processor 304. Alternatively a measure of signal strength can be computed by the processor 304 based on a rate of errors that characterizes digital data that is received by the wireless telephone 100. In step 604 an activatable indicia is activated to indicate to the user to re-orient the antenna 128. In the preferred case that the antenna 128 is rigidly affixed to the wireless telephone 100, such an indication will be interpreted as an indication to reorient the entire telephone 100. Alternatively, in the case that the antenna 128 is extensible the activation of the activatable indicia in step 604 is interpreted as an indication to extend and/or reorient the antenna 128. Preferably, the second linear indicia 120 is activated in step 604.

Figure 7:
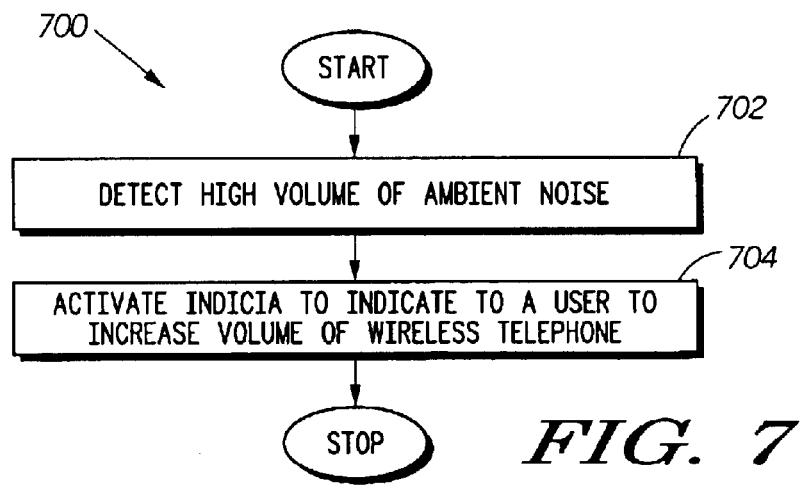
FIG. 7 is a flow chart of a third method for operating the wireless telephone shown in FIGS. 1–3 in accordance with a preferred embodiment of the invention.

FIG. 7 is a flow chart of a third method 700 for operating the wireless telephone 100 shown in FIGS. 1–3 in accordance with a preferred embodiment of the invention. Referring to FIG. 7, in step 702 a high volume of ambient noise is detected, and in step 704 an activatable indicia is activated to indicate to the user to increase a volume setting of the wireless telephone 100. Ambient noise can be isolated by using audio processing algorithms that separate ambient noise from voiced sounds. The activatable indicia that is activated in step 704 is preferably the side button graphical icon 114, that is located proximate the side mounted keys 110 that are used to adjust the volume of sound emitted by the wireless telephone 100.

The wireless telephone 100 preferably includes a configuration setting that is accessible through the aforementioned hierarchical menu for disabling the activatable indicia 112, 114, 116, 118, 120, 122 once the user has become proficient in the use of the wireless telephone 100.

Figure 8:
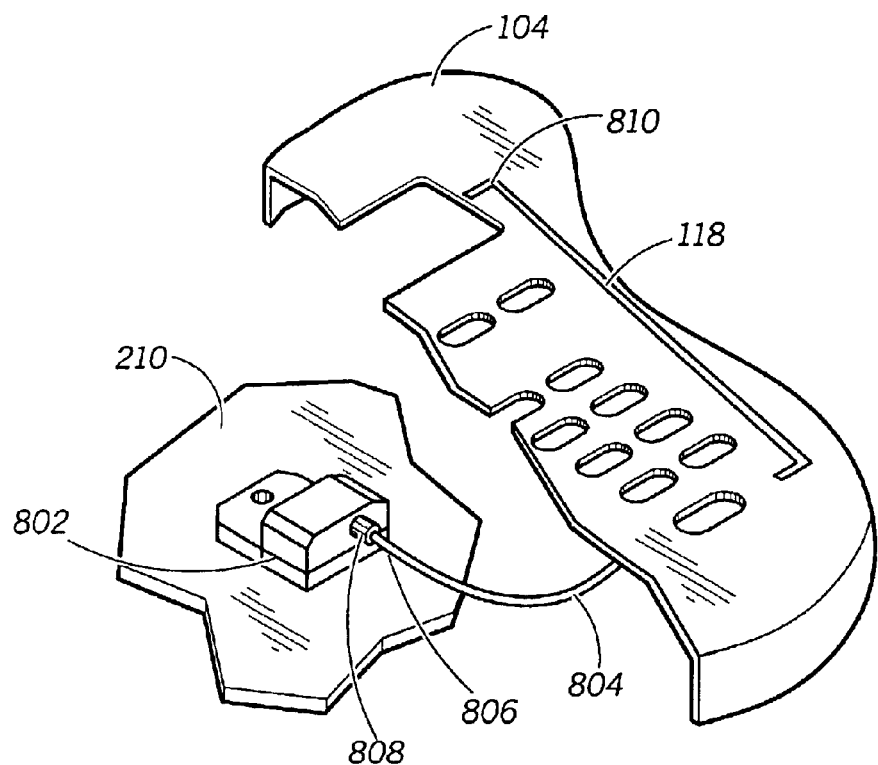
FIG. 8 is a fragmentary perspective view of a first portion a front housing portion, and a circuit substrate of the wireless telephone shown in FIGS. 1–3 in accordance with a preferred embodiment of the invention.

FIG. 8 is a fragmentary perspective view of a first portion of the front housing portion 104 and the circuit substrate 210 of the wireless telephone 100 shown in FIGS. 1–3 in accordance with a preferred embodiment of the invention. As shown in FIG. 8, the circuit substrate 210 supports an optical fiber driver 802. The optical fiber driver preferably includes a light emitting diode (not shown) that is fitted with a coupler 808 for coupling with an optical fiber 804. An end 806 of the optical fiber 804 is inserted into the coupler 808. An indicia portion 810 of the optical fiber 804 is included in the front housing portion 104 and serves as the first linear indicia 118. The indicia portion 810 is preferably treated or prepared to cause the indicia portion 810 to leak light so as to increase an amount of light emitted toward the user. The indicia portion 810 can be treated by lightly abrading its surface in order to cause the indicia portion 810 to leak light. Optical fibers treated or prepared so as to leak light are termed leaky optical fibers. Preferably, at least a front surface of the front housing portion 104 is transparent so that light emitted by the indicia portion 810 escapes. Alternatively, the indicia portion 810 is partially exposed at the front surface of the front housing portion 104 so that light escapes toward the user.

Figure 9:
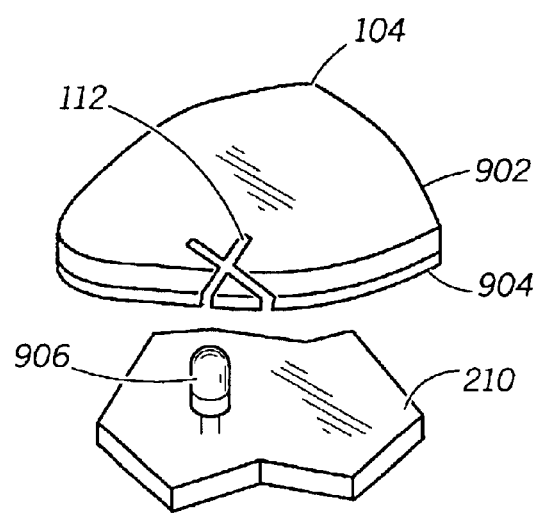
FIG. 9 is a fragmentary perspective view of a second portion of the front housing portion of the wireless telephone shown in FIGS. 1–3 in accordance with a preferred embodiment of the invention.

FIG. 9 is a fragmentary perspective view of a second portion of the front housing portion 104 of the wireless telephone 100 shown in FIGS. 1–3 in accordance with a preferred embodiment of the invention. As shown in FIG. 9, the front housing portion 104 includes a transparent plastic wall 902 that is covered on a backside by an opaque material 904. The opaque material 904 is made into a transmissive mask by selectively removing a portion of the opaque material 904 so as to define the graphical icon 112. Alternatively the opaque material is patterned to define the activatable text 116. The opaque material 904 is preferably an opaque paint that is selectively removed using laser etching. Alternatively, the opaque material 904 is initially applied in a pattern that defines the graphical icon 112. It will be appreciated by those of ordinary skill in the art that the opaque material can comprise and/or be applied using any combination of methods described herein or an equivalent. A light emitting diode 906 (a type of light source) is supported on the circuit substrate 210 beneath the graphical icon 112 shown in FIG. 9. The light emitting diode 906 is coupled to the indicia driving circuits 310. In order to activate the graphical icon 112 shown in FIG. 9 the light emitting diode 906 is turned on.

Figure 10:
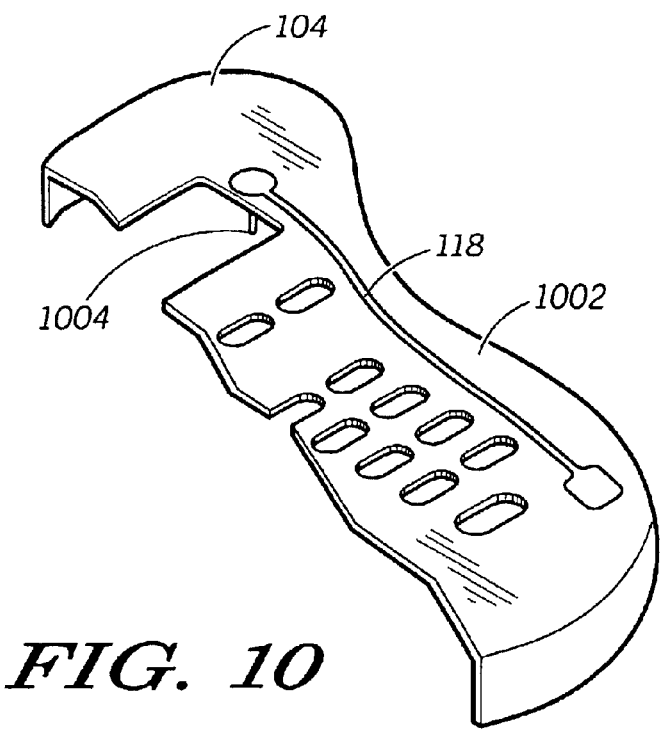
FIG. 10 is a fragmentary perspective view of the front housing portion of the wireless telephone shown in FIG. 1 in accordance with a first alternative embodiment of the present invention.

FIG. 10 is a fragmentary perspective view of the front housing portion 104 of the wireless telephone 100 shown in FIG. 1 according to a first alternative embodiment of the invention. In the first alternative embodiment, the first linear indicia 118 takes the form of an electrochromic device 1002. As is known to one of ordinary skill in the art, electrochromic devices comprise a stack of layers including a first electrode layer, an ion donor layer, a solid electrolyte layer, an electrochromic material layer, and a second electrode layer. At least an outward facing electrode layer of the electrochromic device 1002 is transparent (e.g., indium-tin oxide). A first terminal 1004, and a second terminal (not shown) extend through the front housing portion 104 to supply electric power to the electrochromic device 1002. The terminals 1004, (not shown) are coupled to the indicia driving circuits 310. The electrochromic device 1002 changes color in response to an applied voltage. Activation of the electrochromic device 1002 is accomplished by applying a voltage to the electrochromic device 1002, or alternatively by removing a voltage from the electrochromic device 1002.

Figure 11:
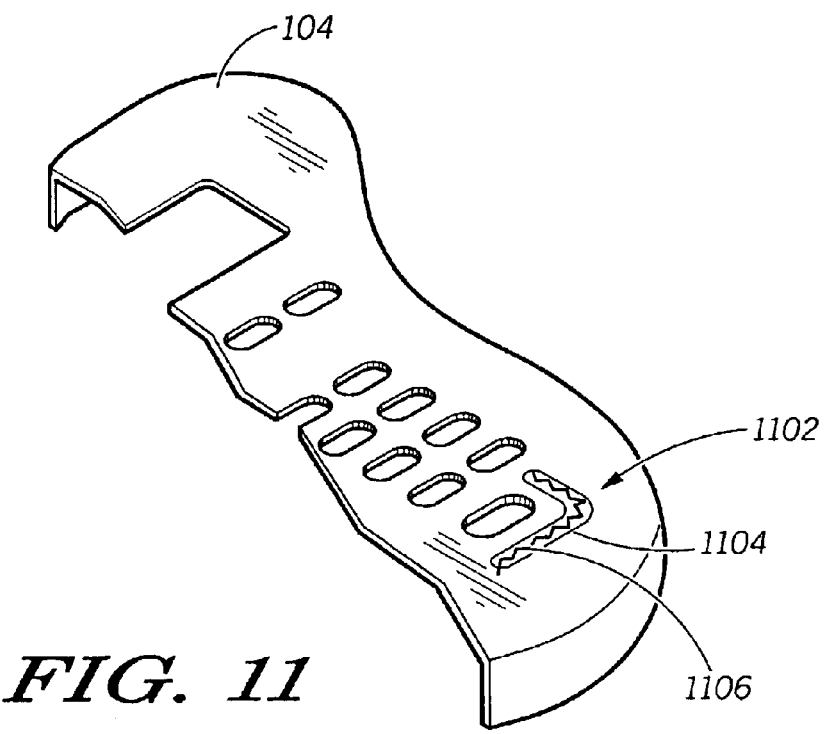
FIG. 11 is a fragmentary perspective view of the front housing portion of the wireless telephone shown in FIG. 1 in accordance with a second alternative embodiment of the present invention.

FIG. 11 is a fragmentary perspective view of the front housing portion 104 of the wireless telephone 100 shown in FIG. 11 according to a second alternative embodiment of the present invention. As shown in FIG. 11, an activatable indicia 1102 that includes a thermochromic material 1104 applied to the front housing portion 104 is provided. An ohmic heating element 1106 is disposed proximate (underlying as shown) the thermochromic material 1104. Although in practice the ohmic heating element 1106 might in practice be completely occluded by the thermochromic material 1104, the ohmic heating element 1106 is illustrated FIG. 11 as it would be seen in an x-ray view in the interest of pedagogical clarity. The ohmic heating element 1106 is preferably embedded (insert molded) within the front housing portion 1104 and includes leads (not shown) that extend out of the back of the front housing portion 104 for the purpose of connecting to the indicia driver circuits 310 on the circuit substrate 210. The activatable indicia 1102 shown in FIG. 11 is preferably activated by applying a voltage to the ohmic heating element 1106.

Alternatively, an electroluminescent device is used as an activable indicia, e.g., as the linear indicia 118. As known to one of ordinary skill in the art, an electroluminescent device comprises an insulated electroluminescent phosphor material layer disposed between two electrode layers.

Figure 12:
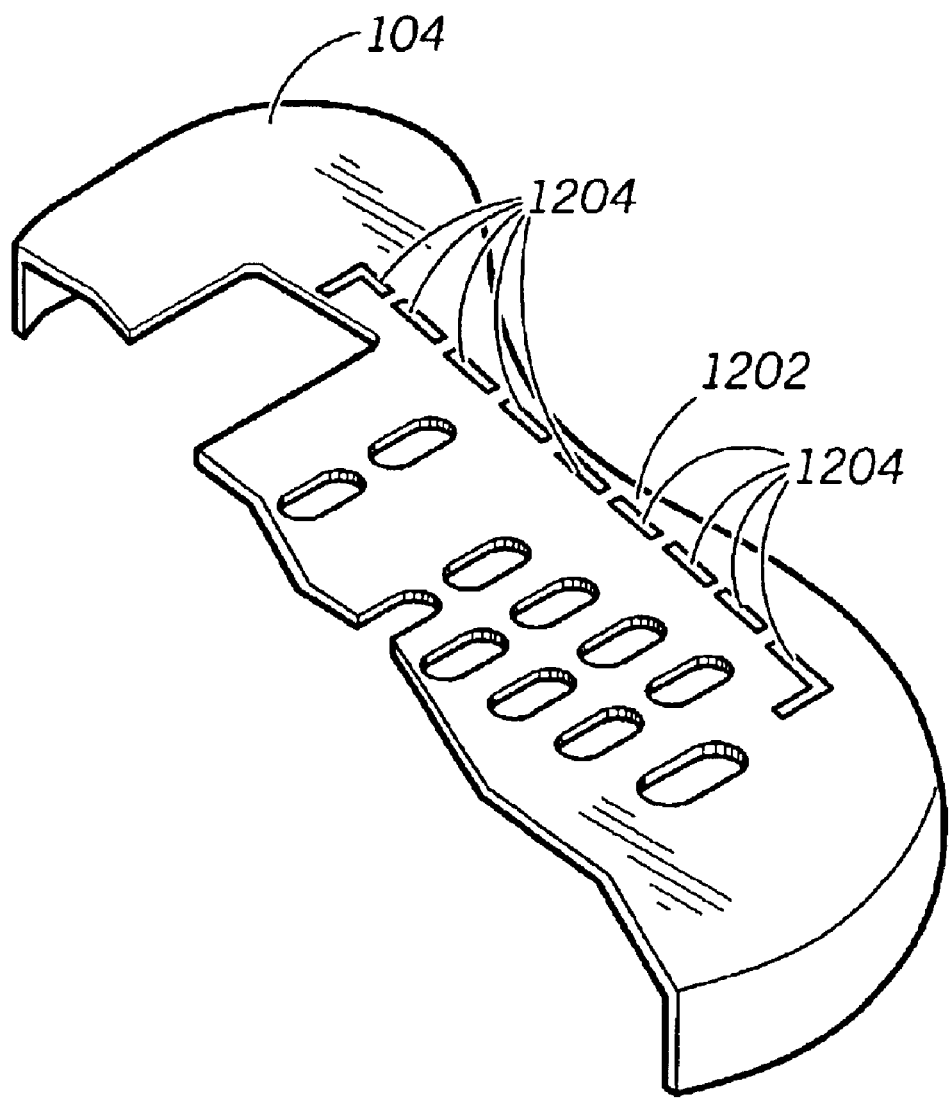
FIG. 12 is a fragmentary perspective view of the front housing portion of the wireless telephone shown in FIG. 1 in accordance with a third alternative embodiment of the present invention.

FIG. 12 is a fragmentary perspective view of the front housing portion 104 of the wireless telephone shown in FIG. 1 according to a third alternative embodiment of the present invention. According to the third alternative embodiment of the invention, a linear indicia 1202 that includes a plurality of separately actuable segments 1204 is provided. The separately actuable segments 1204 are operated in sequence so that illumination progresses along the linear indicia 1202, thus drawing the user's attention to a manually operable control located at an end of the linear indicia 1202.

The activatable indicia described above with reference to FIGS. 1–3, 8–11 are activated in accordance with the methods illustrated with reference FIGS. 4–7 in order to assist users especially novice users in operating the wireless telephone 100. Such assistance is especially useful given the increases in functionality and corresponding increases in complexity of electronic devices that have occurred recently and are likely to continue.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of operating an electronic device having a housing and a plurality of keys, the method comprising the steps of:
   detecting a subset of a set of keystrokes of the plurality of keys required to enter a command; and
   activating one or more indicia within the housing that identify one or more alternative additional keys corresponding to keystrokes required to continue entering the command.

2. The method of operating the electronic device according to claim 1 wherein the one or more indicia that identify one or more alternative additional keys comprise one or more light sources.

3. The method of operating the electronic device according to claim 1 wherein
   the step of detecting the subset of the set of keystrokes comprises the sub-step of:
      detecting a sequence of keystrokes that include of a telephone number; and the step of activating the one or more indicia includes the sub-step of:
      activating an indicia that identifies a send key.

4. The method of operating the electronic device according to claim 1 further comprising the step of:
   in response to detecting the subset of keystrokes, displaying information based on the subset of key strokes on a display.

5. The method of operating the electronic device according to claim 1 wherein the one or more indicia that identify one or more alternative additional keys is located on a front housing portion of the housing of the electronic device.

6. A method of operating an electronic device, the method comprising the steps of:
   detecting a subset of a set of keystrokes required to enter a command;
   displaying information based on the subset of key strokes on a display; and
   activating one or more indicia that identify one or more alternative additional keys corresponding to keystrokes required to complete the command,
   wherein the step of activating one or more indicia includes the sub-step of:
      activating a linear indicia that includes:
         a first end located proximate the information; and
         a second end located proximate a key corresponding to an additional keystroke required to complete the command.

7. A method of operating an electronic device, the method comprising the steps of:
   detecting a subset of a set of keystrokes required to enter a command; and
   activating one or more indicia that identify one or more alternative additional keys corresponding to keystrokes required to complete the command,
   wherein the step of activating one or more indicia includes the sub-step of:
      activating a linear indicia that includes:
         a first end located proximate a first key that corresponds to a last key stroke among the subset of the set of keystrokes; and
         a second end located proximate a second key that corresponds to an alternative next key that is among the one or more alternative additional keys corresponding to keystrokes required to complete the command.

8. A method of operating an electronic device, the method comprising the steps of:
   detecting a subset of a set of keystrokes required to enter a command; and
   activating one or more indicia that identify one or more alternative additional keys corresponding to keystrokes required to complete the command,
   wherein the step of activating one or more indicia includes the sub-step of:
      activating a linear indicia that includes a plurality of separately actuable segments by actuating the plurality of separately actuable segments in sequence;
      whereby, illumination progresses along the linear indicia.

9. A method of operating an electronic device, the method comprising the steps of:
   detecting a non optimal operating condition; and
   activating an indicia identifying to a user a corrective action to correct the non optimal operating condition, wherein the indicia is proximately located with a means for the corrective action.

10. The method of operating the electronic device according to claim 9 wherein:
   the electronic device comprises a wireless communication device, and further wherein
   the step of detecting the non optimal operating condition comprises the sub step of:
      detecting a low signal strength; and
   the step of activating the indicia to indicate the user action to correct the non optimal operating condition comprises the sub-step of:
      activating an indicia to indicate to the user to adjust an antenna of the wireless communication device.

11. The method of operating the electronic device according to claim 10 wherein:

the subs-step of activating the indicia comprises the sub-step of:
   activating a graphical icon that points to the antenna of the wireless communication device.

12. A method of operating an electronic device, the method comprising the steps of:
   detecting a non optimal operating condition, wherein the step of detecting a non optimal operating condition comprises the sub-step of:
      detecting a high volume of ambient noise; and
   activating an indicia to indicate to a user action to correct the non optimal operating condition, wherein the step of activating an indicia comprises the sub-step of:
      activating a graphical icon to indicate the user to increase a speaker volume of the electronic device.

13. An electronic device comprising:
   a plurality of manually operable controls; and
   a housing including:
      a plurality of selectively activatable indicia integral to the housing for identifying to a user one or more of the plurality of manually operable controls that can be operated when the electronic device is in a predetermined state to control the electronic device.

14. The electronic device according to claim 13 wherein the selectively activatable indicia comprise:
   a leaky optical fiber.

15. The electronic device according to claim 13 wherein the selectively activatable indicia comprises:
   a transmissive mask.

16. The electronic device according to claim 13 wherein the selectively activatable indicia comprise:
   a linear indicia.

17. The electronic device according to claim 16 wherein the linear indicia comprises:
   a plurality of separately actuable segments.

18. The electronic device according to claim 13 wherein the plurality of selectively activatable indicia comprise:
   one or more light sources.

19. The electronic device according to claim 18 wherein the one or more light sources comprise:
   one or more light emitting diodes.

20. The electronic device according to claim 13 wherein:
   the selectively activatable indicia comprises:
      a first electrode;
      a second electrode; and
      an electrochromic coating that is applied to the housing portion and extends between the first electrode and the second electrode.

21. The electronic device according to claim 13 wherein the selectively activatable indicia comprises:
   a thermochromic material; and
   an ohmic heating element proximate the thermochromic material.

22. A wireless communication device comprising:
   a means for detecting ambient noise; and
   a processor coupled to the means for detecting ambient noise, wherein the processor is adapted to activate an activatable indicia identifying one or more manually operable controls for adjusting a speaker volume of the wireless communication device when a high volume of ambient noise is detected.

23. The wireless communication device according to claim 22 wherein the activatable indicia comprises:
   a light source.

24. The wireless communication device according to claim 23 further comprising:
   a display for, at least, displaying an indication of the ambient noise; and
   wherein the activatable indicia includes a linear indicia that includes:
      a first end disposed proximate the indication of the ambient noise on the display; and
      a second end disposed proximate a volume control key.

25. An electronic device comprising:
   a means for detecting a subset of a set of keystrokes of a plurality of keys required to enter a command; and
   a means within a housing of the electronic device for identifying one or more alternative additional keys corresponding to keystrokes required to continue entering the command.

26. A method of operating an electronic device having a housing and a plurality of keys, the method comprising the steps of:
   detecting a subset of a set of keystrokes of the plurality of keys required to enter a command;
   detecting an elapsing of a time interval; and
   activating one or more indicia within the housing that identify one or more alternative additional keys corresponding to keystrokes required to continue entering the command.

* * * * *